(12) United States Patent
Hayashi

(10) Patent No.: US 8,508,803 B2
(45) Date of Patent: Aug. 13, 2013

(54) IMAGE READING APPARATUS AND IMAGE READING METHOD INCLUDING A DIVIDING UNIT THAT DIVIDES IMAGE DATA INTO VERTICAL-STREAK-CORRECTION SUBJECT DATA

(75) Inventor: Shingo Hayashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 882 days.

(21) Appl. No.: 12/555,407

(22) Filed: Sep. 8, 2009

(65) Prior Publication Data
US 2010/0067061 A1   Mar. 18, 2010

(30) Foreign Application Priority Data
Sep. 16, 2008 (JP) ................................. 2008-236874

(51) Int. Cl.
*G06T 5/00* (2006.01)
(52) U.S. Cl.
USPC ............................ 358/3.26; 358/453; 358/2.1
(58) Field of Classification Search
None
See application file for complete search history.

(56) References Cited

U.S. PATENT DOCUMENTS

| | | | | |
|---|---|---|---|---|
| 2005/0280867 A1* | 12/2005 | Arai | | 358/2.1 |
| 2006/0082836 A1* | 4/2006 | Mimura | | 358/448 |
| 2008/0252922 A1* | 10/2008 | Ikegami et al. | | 358/1.15 |

FOREIGN PATENT DOCUMENTS

| | | |
|---|---|---|
| JP | 2006-60698 | 3/2006 |
| JP | 2006-229847 | 8/2006 |

* cited by examiner

*Primary Examiner* — Twyler Haskins
*Assistant Examiner* — Christopher D Wait
(74) *Attorney, Agent, or Firm* — Oblon, Spivak, McClelland, Maier & Neustadt, L.L.P.

(57) ABSTRACT

An image acquiring unit reads an original and outputs whole image data of the original including a vertical streak portion corresponding to a location of a foreign material on a read surface of the reading unit. A storing unit stores therein the image data output from the image acquiring unit. A dividing unit defines an edge portion of the image data and divides the image data into vertical-streak-correction subject data and image portion data. A vertical-streak correcting unit performs a correction process on the vertical-streak-correction subject data to compensate a degradation in image quality due to the foreign material.

16 Claims, 7 Drawing Sheets

SCANNING (MAIN SCANNING) DIRECTION OF CCD

IMAGE READING APPARATUS AND IMAGE READING METHOD INCLUDING A DIVIDING UNIT THAT DIVIDES IMAGE DATA INTO VERTICAL-STREAK-CORRECTION SUBJECT DATA

CROSS-REFERENCE TO RELATED APPLICATIONS

The present application claims priority to and incorporates by reference the entire contents of Japanese Patent Application No. 2008-236874 filed in Japan on Sep. 16, 2008.

BACKGROUND OF THE INVENTION

1. Field of the Invention

The present invention relates to an image reading apparatus and an image reading method.

2. Description of the Related Art

In recent years, a variety of apparatuses, such as a printer and what is called a multifunction product (MFP), that provide a function as a scanner are used. The MFP is an apparatus that functions as, e.g., a copier, a scanner, a facsimile machine, and a printer in a single casing; however, degradation in image quality can occur due to dirt, such as dust, sticking to a read surface of such an apparatus capable of scanning. Accordingly, various methods have been disclosed to prevent such degradation in image quality.

An example of such a technique is disclosed in Japanese Patent Application Laid-open No. 2006-229847. In this technique, an image reading apparatus includes a dust detecting unit. The dust detecting unit compares an image acquired by scanning with a normal image based on reference image data having been stored in advance, thereby determining whether a read surface is dirty. When it is determined that a value indicative of a level of dirtiness exceeds a threshold value, scanning is stopped and a notification that the read surface is dirty is provided to a user. When it is determined that the value is below the threshold value, various corrections such as shading correction is performed to the scanned-in image data depending on the level of dirtiness.

Scanning can be performed in any one of a sheet-fed mode and a flatbed mode. In the sheet-fed mode, scanning is performed by moving an original and fixing a carriage at a predetermined position. In the flatbed mode, scanning is performed by moving the carriage and fixing an original. The various corrections can be made in any one of these modes.

However, in the sheet-fed mode, when it is determined that image data has been acquired through a read surface to which the dust or the like is sticking, it is difficult to correct data (hereinafter, "vertical-streak-correction subject data") that is a portion of the scanned-in image data corresponding to a portion where the dirt is present concurrent with image processing on the remainder of the image data (hereinafter, "image portion data"). Accordingly, in some cases, before the scanned-in image data is stored in a memory or the like as image data, the vertical-streak-correction subject data is divided from the image portion data. After the image portion data has been stored and subjected to the image processing, correction is made to the vertical-streak-correction subject data.

Figure 7A:
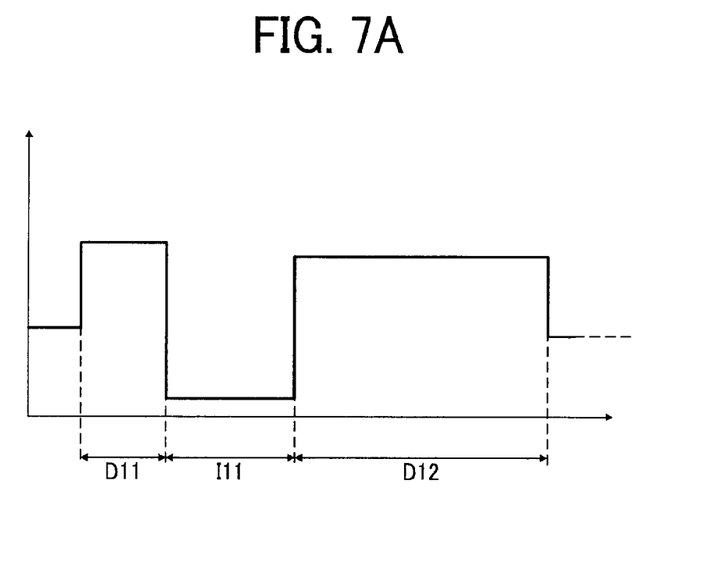
FIG. 7A is exemplary image data to be processed by a conventional technique.

This technique will be described more specifically with reference to FIGS. 7A and 7B. FIG. 7A depicts exemplary image data to be processed by this technique. The image data acquired by a scanner by reading an original is divided into vertical-streak-correction subject data I11 and image portion data D11, D12, and then output to a memory or the like. The image portion data D11, D12 corresponds to portions where the no dirt is present. Referring to FIG. 7A, the image portion data D11 and D12 corresponds to portions where pixel values are relatively large while the vertical-streak-correction subject data I11 corresponds to a portion where pixel values are relatively small.

Figure 7B:
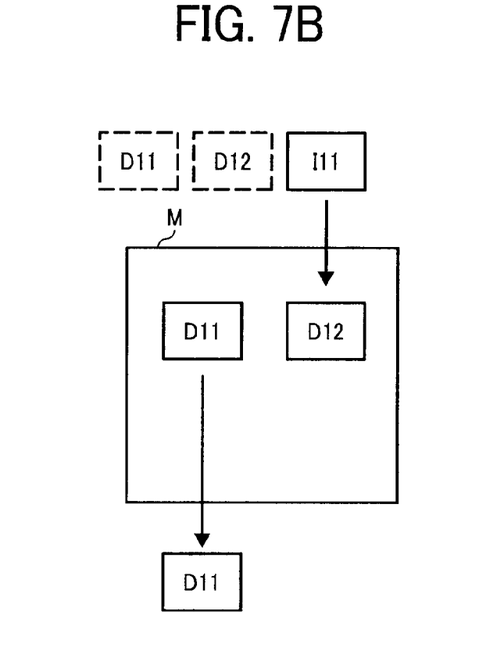
FIG. 7B is a schematic diagram depicting how the image data depicted in FIG. 7A is processed.

FIG. 7B is a schematic diagram depicting how the image portion data D11, D12 is processed. Before the image data depicted in FIG. 7A is stored in a memory M, the image data is divided into the image portion data D11 and D12 and the vertical-streak-correction subject data I11, which are then sequentially stored in the memory M and subjected to image processing. Correction is then made to the vertical-streak-correction subject data I11. Accordingly, in this technique, a relatively long period of time has inefficiently elapsed from the start of the scanning operation until its end, which has been a problem.

SUMMARY OF THE INVENTION

It is an object of the present invention to at least partially solve the problems in the conventional technology.

According to one aspect of the present invention, there is provided an image reading apparatus including an automatic document feeding unit that automatically conveys an original and a reading unit that reads the original while the original is being conveyed by the automatic document feeding unit. The reading unit includes: an image acquiring unit that reads the original and outputs whole image data of the original including a vertical streak portion that is a portion of the original corresponding to a location of a foreign material on a read surface of the reading unit; a storing unit that stores therein the image data output from the image acquiring unit; a dividing unit that defines an edge portion of the image data stored in the storing unit and divides the image data into vertical-streak-correction subject data that is a portion of the image data corresponding to the vertical streak portion and image portion data that is remainder of the image data with defined edge portion as a boundary; and a vertical-streak correcting unit that performs a correction process on the vertical-streak-correction subject data to compensate a degradation in image quality due to the foreign material.

Furthermore, according to another aspect of the present invention, there is provided a method of reading an image in an image reading apparatus that includes an automatic document feeding unit that automatically conveys an original, a reading unit that reads the original while the original is being conveyed by the automatic document feeding unit, and a storing unit that stores therein whole image data of the original. The method includes: image acquiring including the reading unit reading the original and outputting whole image data of the original including a vertical streak portion that is a portion of the original corresponding to a location of a foreign material on a read surface of the reading unit; dividing including the reading unit defining an edge portion of the image data stored in the storing unit and dividing the image data into vertical-streak-correction subject data that is a portion of the image data corresponding to the vertical streak portion and image portion data that is remainder of the image data with defined edge portion as a boundary; and vertical-streak correcting including the reading unit performing a correction process on the vertical-streak-correction subject data to compensate a degradation in image quality due to the foreign material.

Moreover, according to still another aspect of the present invention, there is provided a computer program product including a computer-usable medium having computer-readable program codes embodied in the medium for reading an image in an image reading apparatus that includes an automatic document feeding unit that automatically conveys an original, a reading unit that reads the original while the original is being conveyed by the automatic document feeding unit, and a storing unit that stores therein whole image data of the original. The program codes when executed causing a computer to execute: image acquiring including the reading unit reading the original and outputting whole image data of the original including a vertical streak portion that is a portion of the original corresponding to a location of a foreign material on a read surface of the reading unit; dividing including the reading unit defining an edge portion of the image data stored in the storing unit and dividing the image data into vertical-streak-correction subject data that is a portion of the image data corresponding to the vertical streak portion and image portion data that is remainder of the image data with defined edge portion as a boundary; and vertical-streak correcting including the reading unit performing a correction process on the vertical-streak-correction subject data to compensate a degradation in image quality due to the foreign material.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

An image reading apparatus according to an embodiment of the present invention can be an apparatus capable of performing scanning such as a multifunction product (MFP) that provides functions as, e.g., a copier, a facsimile machine, a printer, and a scanner in a single casing. In the following description, the image reading apparatus is embodied as an MFP; however, the present invention can be applied to any apparatus that can perform scanning.

Figure 1:
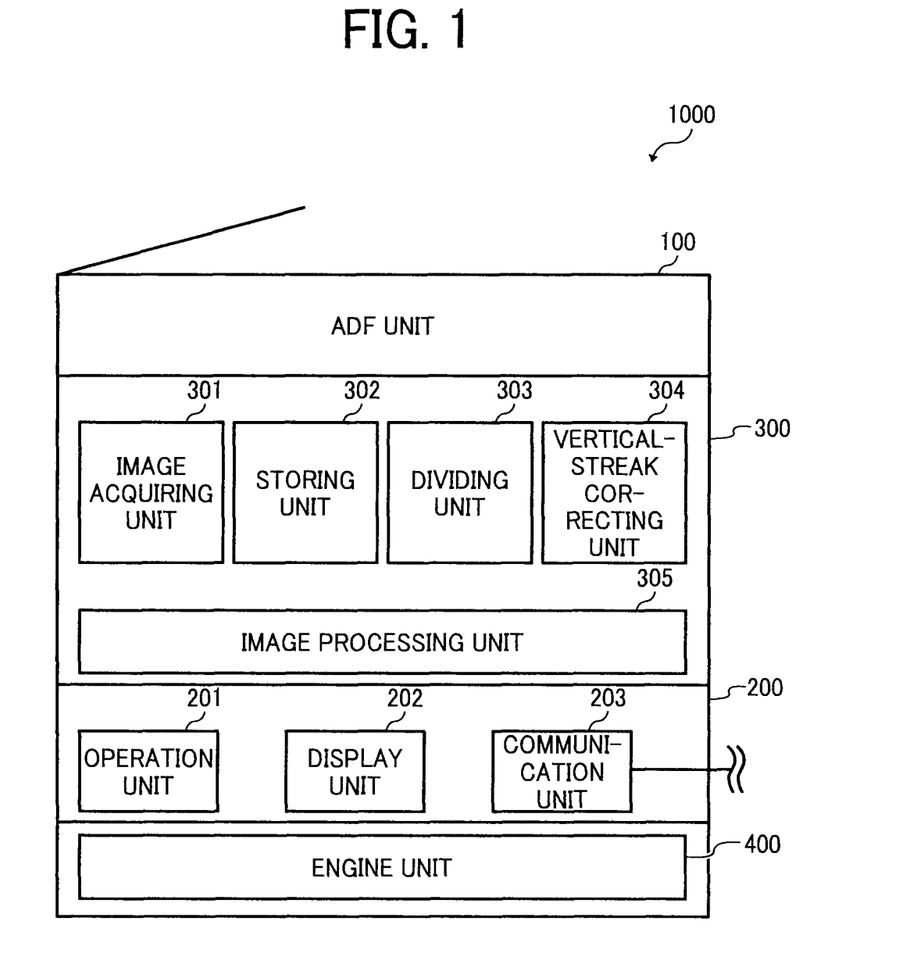
FIG. 1 is a block diagram depicting a functional configuration of an MFP according to a first embodiment of the present invention.

FIG. 1 is a block diagram of an MFP 1000 according to a first embodiment of the present invention. The MFP 1000 includes an automatic document feeder (ADF) unit 100, an operation setting unit 200, a scanner unit 300, and an engine unit 400.

Figure 2:
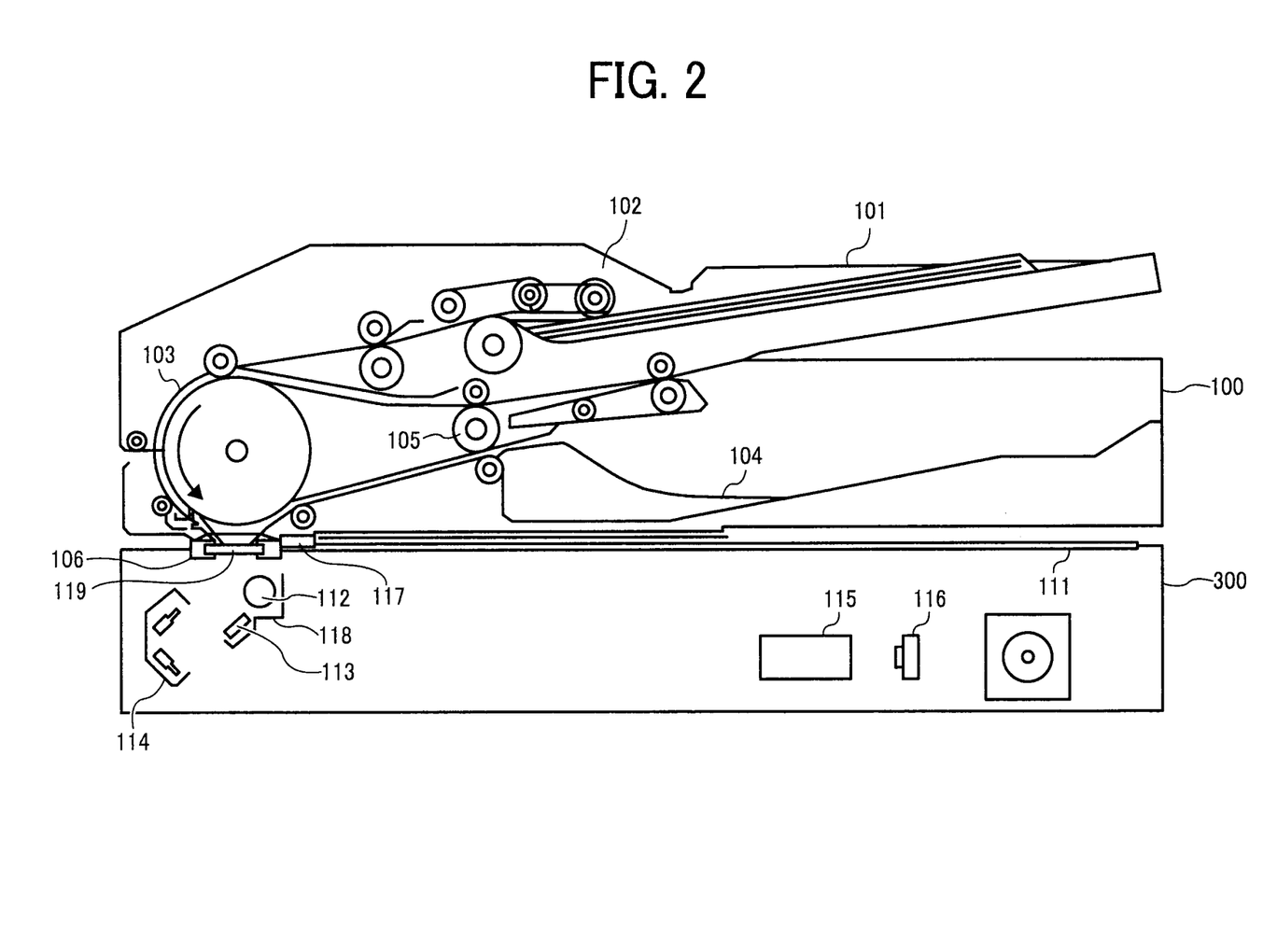
FIG. 2 is a schematic cross-sectional view of an exemplary physical configuration of an ADF unit and a scanner unit depicted in FIG. 1.

The ADF unit 100 includes an ADF and conveys an original. FIG. 2 is a schematic diagram that specifically illustrates the configuration of the ADF unit 100. The ADF unit 100 includes an original table 101, on which an original is to be placed, a sheet feed roller 102, a set of guide rollers 103, an original receiving tray 104, and a pair of sheet output rollers 105. The sheet feed roller 102 feeds an original from the original table 101 toward the guide rollers 103. The guide rollers 103 convey the original downstream. An original having been read is conveyed by the sheet output rollers 105 and placed on the original receiving tray 104.

A stack of originals is placed on the original table 101 with their image surfaces to be scanned facing upward. When an operation-input receiving unit 201-b of the operation setting unit 200 receives an instruction to perform scanning, the originals are delivered one by one to a predetermined position on a sheet-fed-mode exposure glass 119 or on a flatbed-mode exposure glass 111.

In the sheet-fed mode, image reading is performed by moving an original and fixing a carriage 118 at a sheet-fed-mode reading position. The original, which is a lowermost one of the stack of the originals, is delivered by the sheet feed roller 102 and the guide rollers 103 out of the original table 101. In the flatbed mode, image reading is performed by fixing an original and moving the carriage 118 below the original at a low speed.

An image acquiring unit 301 of the scanner unit 300, which will be described later, reads the original having been delivered to the predetermined position on the sheet-fed-mode exposure glass 119 or to the flatbed-mode exposure glass 111 to acquire image data. The original having been read in this manner is output to the original receiving tray 104 by the guide rollers 103 and the sheet output rollers 105.

The scanner unit 300 can perform scanning in any one of the sheet-fed mode and the flatbed mode; however, it is mentioned below on an assumption that scanning is performed in the sheet-fed mode.

FIG. 2 is a schematic cross-sectional view of both the ADF unit 100 and the scanner unit 300, illustrating physical relationship between the ADF unit 100 and the scanner unit 300. The scanner unit 300 will be described later rather than immediately below. The operation setting unit 200 will be described immediately below.

Referring to FIG. 1, the operation setting unit 200 includes an operation unit 201, a display unit 202, and a communication unit 203.

Figure 3:
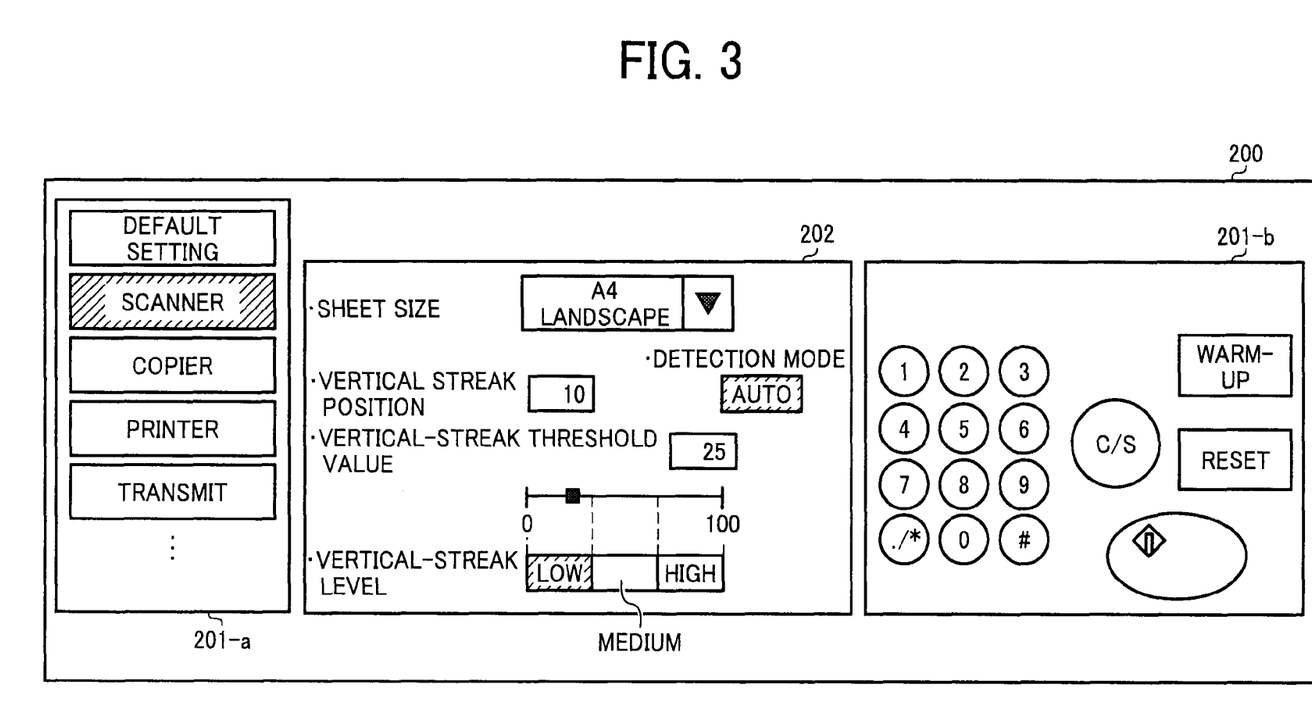
FIG. 3 is a schematic diagram depicting an exemplary physical configuration of an operation setting unit depicted in FIG. 1.

FIG. 3 is a schematic diagram depicting an exemplary physical configuration of the operation unit 201 and the display unit 202 of the operation setting unit 200. The operation unit 201 includes a function-setting receiving unit 201-a and the operation-input receiving unit 201-b. A function is selected from various functions provided by the MFP 1000 such as a scanner function and a copier function on the function-setting receiving unit 201-a. The operation-input receiving unit 201-b receives an instruction to perform the selected function.

It is mentioned below that settings for scanning are directly entered by a user on a touch panel or the like of the operation unit 201 and the display unit 202 of the operation setting unit 200. Alternatively, settings for scanning can be entered, for example, by using the communication unit 203 of the MFP 1000. More specifically, the communication unit 203 can obtain information about settings for scanning from an information apparatus connected to a communication network via the communication network. The settings are then displayed on the display unit 202 of the operation setting unit 200 so that a user can determine whether to accept the settings to perform one of the various functions.

The display unit 202 includes the touch panel or the like. When the selection of the function is received by the function-setting receiving unit 201-a, information about settings for use in the selected function is displayed on and entered from the display unit 202.

More specifically, as depicted in FIG. 3, when the scanner function is selected on the function-setting receiving unit 201-a, the display unit 202 displays one of detection modes including an "auto" detection mode and a "manual" detection mode. In the "auto" detection mode, a dividing unit 303, which will be described later, automatically determines a position of the portion (hereinafter, "potentially-vertical-streak portion") where dust, dirt, or the like (hereinafter, "foreign material") sticks to the exposure glass. The "vertical" direction indicates the sub-scanning direction. In this mode, a sheet size (e.g., A4 landscape) of the original is automatically determined. In the "manual" detection mode, the position of the potentially-vertical-streak portion is not automatically detected.

The display unit 202 displays a vertical streak position when the "manual" detection mode is selected as the detection mode. The vertical streak position indicates the position of an area (hereinafter, "streak-correction subject portion") where detected intensity of light emitted for scanning and reflected from the original (hereinafter, "reflection light intensity") is below a predetermine threshold value (hereinafter, "vertical-streak threshold value") in the potentially-vertical-streak portion. When the "auto" detection mode is selected as the detection mode, the display unit 202 displays a vertical-streak threshold value and vertical-streak levels into which vertical-streak threshold values are classified according to magnitudes of intensities of light reflected from the original.

A user can change these settings displayed on the display unit 202 as required by using the touch panel or the like. For example, if it difficult for a user to adjust settings related to a vertical-streak threshold value represented in a numerical number, the user can select one of "low", "medium", and "high" levels of the vertical-streak levels to set the vertical-streak threshold value.

If there are two or more streak-correction subject portions and an average value of reflection light intensities of the streak-correction subject portions is below the vertical-streak threshold value, the display unit 202 displays an alarm screen for notification that the scanning operation itself is anomalous rather than the image data. The communication unit 203 will be described below with reference to FIG. 1.

The communication unit 203 exchanges data with the other information apparatus connected to the communication network. For example, when the MFP 1000 is connected via the communication network with the information apparatus, the communication unit 203 transmits data pertaining to the alarm screen to the information apparatus. A physical configuration of the scanner unit 300 will be described below with reference to FIG. 2.

The scanner unit 300 includes, in the physical configuration, the flatbed-mode exposure glass 111, an exposure lamp 112, a first mirror 113, a second mirror 114, a lens 115, a charge coupled device (CCD) 116, a white reference plate 117, the carriage 118, the sheet-fed-mode exposure glass 119, and a streak detecting device 106. The exposure lamp 112 illuminates a surface to be read of an original. The first mirror 113, the second mirror 114, the lens 115, and the CCD 116 are optics that cause light reflected from the surface of the original to form an image. The white reference plate 117 is used to form a white reference image for use in the shading correction. The carriage 118 is used to scan the original. The streak detecting device 106 detects a foreign material sticking to the sheet-fed-mode exposure glass 119. A functional configuration of the scanner unit 300 will be described below with reference to FIG. 1.

The scanner unit 300 includes the image acquiring unit 301, a storing unit 302, the dividing unit 303, a vertical-streak correcting unit 304, and an image processing unit 305.

The image acquiring unit 301 scans a portion of an original delivered onto and positioned on the sheet-fed-mode exposure glass 119, and outputs scanned-in image data pertaining to the original to the storing unit 302. The image data is pixel values that represent detected intensities of light emitted from a light source (not shown), which illuminates the original, and reflected from the original. Meanwhile, the image acquiring unit 301 outputs all scanned-in image data to the storing unit 302 regardless of whether the image data includes data corresponding to a streak-correction subject portion.

Figure 4:
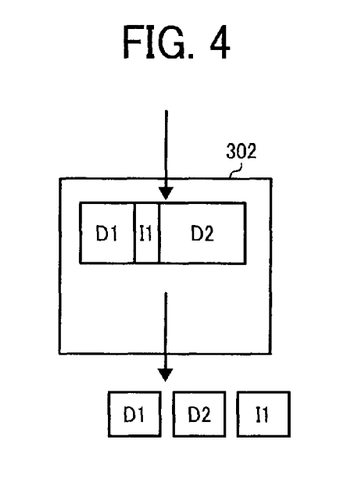
FIG. 4 is a schematic diagram depicting how an image acquiring unit depicted in FIG. 1 processes image data acquired by reading an original.

FIG. 4 depicts how the image acquiring unit 301 processes scanned-in image data acquired by reading an original. The image acquiring unit 301 reads the original, and outputs all scanned-in image data to the storing unit 302. The scanned-in image data includes data (hereinafter, "vertical-streak-correction subject data") I1 that corresponds to the streak-correction subject portion and image data (hereinafter, "image portion data") D1 and D2 that is the remainder of the scanned-in image data. In FIG. 4, the image data is divided into the vertical-streak-correction subject data and the image portion data; however, as mentioned previously, the image acquiring unit 301 performs scanning without distinction between the vertical-streak-correction subject data and the image portion data.

By storing the image data in the storing unit 302 without distinction between the vertical-streak-correction subject data and the image portion data in this manner, it is possible to shorten a latency time involved in dividing the image data into the image data portion D11 and D12 from the vertical-streak-correction subject data I11 as compared to a latency time in the conventional technique having been mentioned with reference to FIG. 7B. The storing unit 302 will be described below with reference to FIG. 1.

The storing unit 302 is a storage medium, such as a memory or a hard disk drive (HDD), in which the image data output from the image acquiring unit 301 is to be stored. The storing unit 302 also stores therein data about various settings such as the vertical streak position and the vertical-streak threshold value, which have been entered from the operation setting unit 200, and an average vertical-streak threshold value. The average vertical-streak threshold value is used to determine whether the scanning operation itself is anomalous rather than the image data when there are a plurality of pieces of the vertical-streak-correction subject data.

The dividing unit 303 divides the image data into the vertical-streak-correction subject data and the image portion data. The dividing unit 303 determines which one of the "auto" detection mode and the "manual" detection mode has been set as the detection mode on the display unit 202 of the operation setting unit 200. When it is determined that the detection mode has not been set to the "auto" detection mode; i.e., the "manual" detection mode has been set, the dividing unit 303 defines the vertical streak position stored in the storing unit 302 as an edge position.

When it is determined that the "auto" detection mode has been set as the detection mode on the display unit 202 of the operation setting unit 200, the dividing unit 303 determines whether a potentially-vertical-streak portion includes a portion where reflection light intensity is below the vertical-streak threshold value.

When the dividing unit 303 has determined that the potentially-vertical-streak portion does not include a portion where reflection light intensity is below the vertical-streak threshold value; that is, there is no streak-correction subject portion, the image data output from the image acquiring unit 301 is subjected to general image processing such as color adjustment without making correction such as shading correction that is to be made to vertical-streak-correction subject data.

When the dividing unit 303 has determined that the potentially-vertical-streak portion includes a portion where reflection light intensity is below the vertical-streak threshold value, the dividing unit 303 defines the position of the portion where reflection light intensity is below the vertical-streak threshold value as an edge position.

Figure 5:
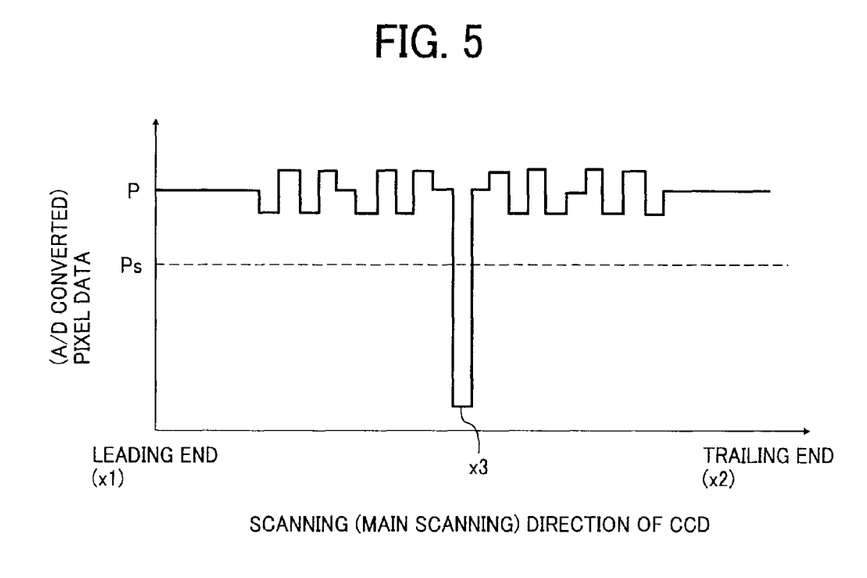
FIG. 5 is an exemplary graph of digital pixel data for which a dividing unit depicted in FIG. 1 defines the position of a portion where reflection light intensity is below a vertical-streak threshold value as an edge position.

FIG. 5 is an exemplary graph of digital pixel data for which the dividing unit 303 defines the position of a portion, which is a part of a potentially-vertical-streak portion, where reflection light intensity P is below a vertical-streak threshold value Ps as an edge position. In the example depicted in FIG. 5, because the reflection light intensity P of the potentially-vertical-streak portion is below the vertical-streak threshold value Ps at a position x3 on a coordinate in the main-scanning direction, the dividing unit 303 defines this position as the edge position.

The dividing unit 303 determines whether there are two or more defined edge positions. When it is determined that there are two or more defined edge positions, an average value of reflection light intensities of the potentially-vertical-streak portion at the edge positions is calculated. The dividing unit 303 then determines whether the calculated average value is below the average vertical-streak threshold value.

When the dividing unit 303 has determined that the calculated average value is below the average vertical-streak threshold value, the communication unit 203 determines whether a request for this scanning operation has been issued by another information apparatus connected to the communication network and transmitted via the communication network.

When the communication unit 203 has determined that the request for this scanning operation has been issued by the other information apparatus and transmitted via the communication network, the communication unit 203 transmits data pertaining to the alarm screen for notification that the scanning operation itself is anomalous rather than the image data to the other information apparatus. When the communication unit 203 has determined that the request for this scanning operation has not been issued by the other information apparatus, the alarm screen is displayed on the display unit 202.

When the dividing unit 303 has displayed the alarm screen on the display unit 202 or transmitted the data pertaining to the alarm screen to the other information apparatus, the dividing unit 303 determines whether an instruction to continue the scanning operation has been entered by a user. When it is determined that the instruction to continue the scanning operation has not been entered; i.e., when an instruction to cancel the scanning operation has been issued, the dividing unit 303 completes the scanning operation.

When it is determined that the "auto" detection mode has not been set as the detection mode for the streak-correction subject portion on the display unit 202 of the operation setting unit 200, or when it is determined that the "auto" detection mode has been set and a potentially-vertical-streak portion includes a portion where reflection light intensity is below the vertical-streak threshold value, the dividing unit 303 divides the image data into the vertical-streak-correction subject data and the image portion data at the edge position. The vertical-streak correcting unit 304 will be described below with reference to FIG. 1.

The vertical-streak correcting unit 304 makes correction such as shading correction to the vertical-streak-correction subject data, and outputs the corrected data to the image processing unit 305.

The image processing unit 305 merges the corrected vertical-streak-correction subject data with the image portion data having been divided by the dividing unit 303, and performs general image processing such as color adjustment on the merged image data.

The engine unit 400 includes various devices such as an exposure device, a photosensitive drum, and a transfer belt that provide the MFP 1000 with the various functions as the copier, the facsimile machine, the printer, the scanner, and the like. The engine unit 400 outputs image data having been subjected to the image processing.

The procedure by which the MFP 1000 performs the scanning operation will be described below.

Figure 6A:
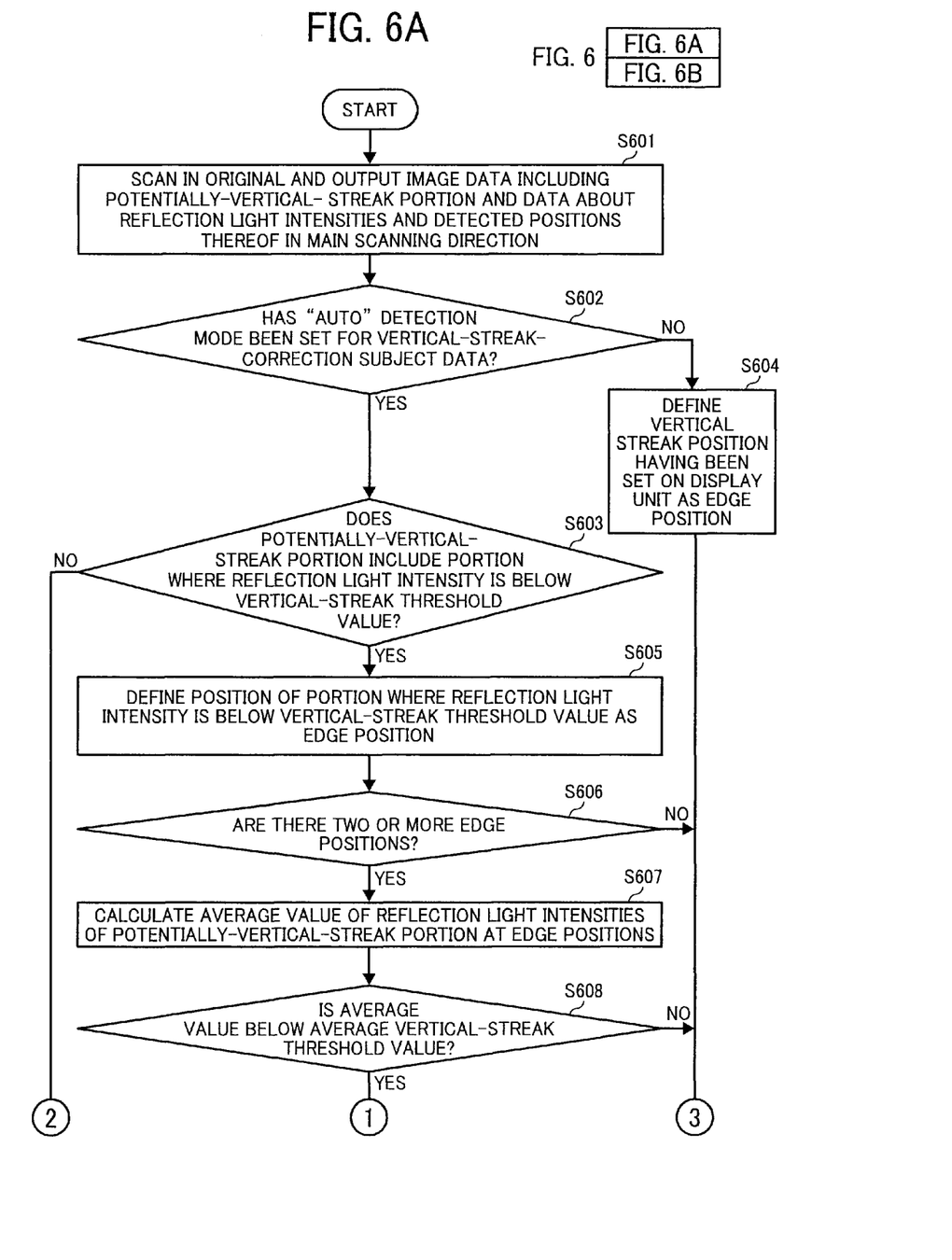
FIG. 6 is a flowchart of a procedure of scanning to be performed by the MFP depicted in FIG. 1.
Figure 6B:
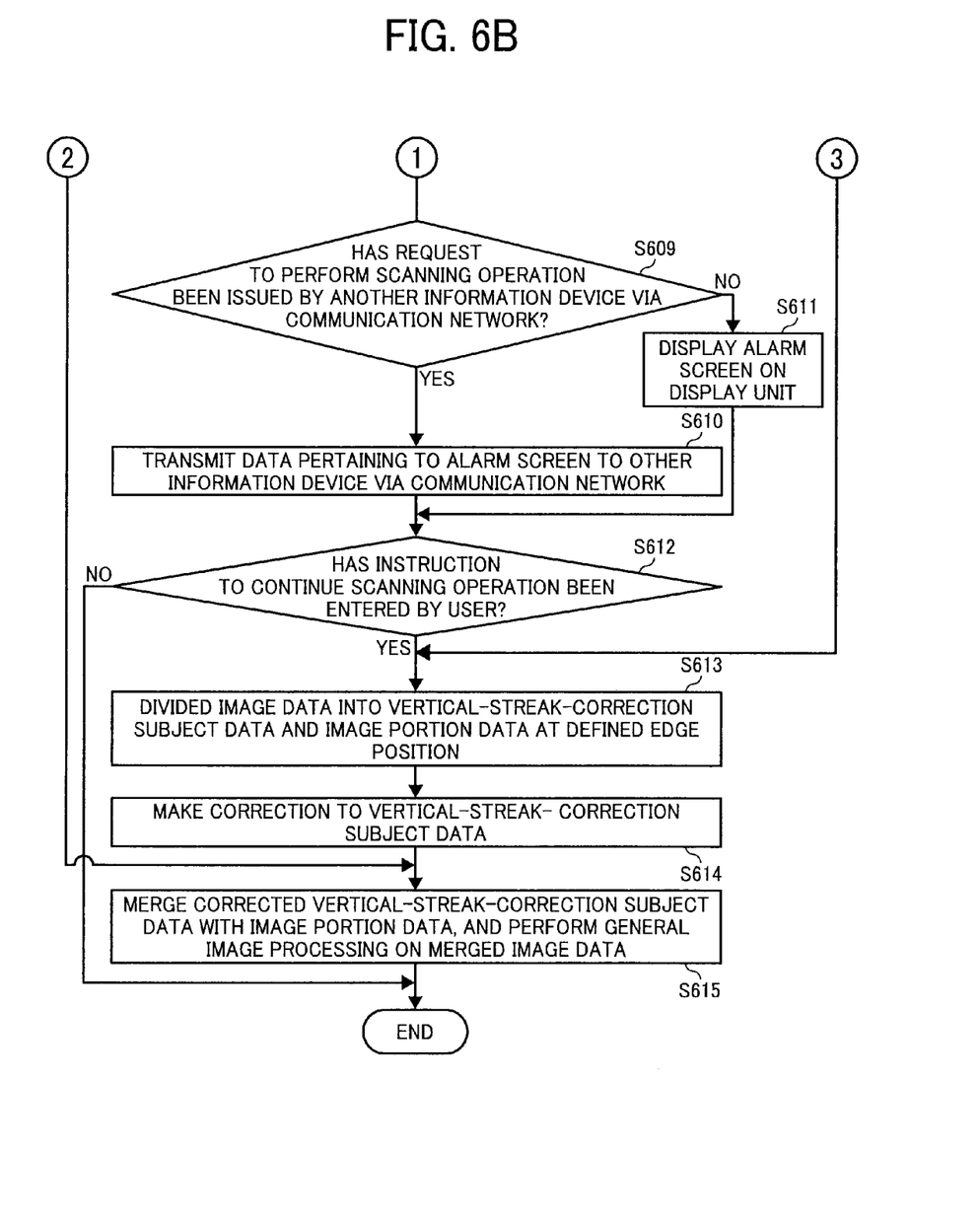

FIG. 6 is a flowchart of the procedure for the scanning operation performed by the MFP 1000. It will be mentioned below on the following assumption. A user has set the vertical streak area, the vertical-streak threshold value, and the like by operating the touch panel of the display unit 202 or the like in advance. The user then places an original in the ADF unit 100 and selects the scanner function on the function-setting receiving unit 201-a of the operation unit 201 and enters an instruction to start scanning from the operation-input receiving unit 201-b.

The original placed in the ADF unit 100 is delivered onto the sheet-fed-mode exposure glass 119. The image acquiring unit 301 scans a portion of the original positioned on the sheet-fed-mode exposure glass 119, and outputs to the storing unit 302 scanned-in image data of the original. The image acquiring unit 301 also outputs data about reflection light intensities and positions indicative of where the reflection intensities are detected in the main-scanning direction (Step S601). The scanned-in image data includes data corresponding to a potentially-vertical-streak portion.

The dividing unit 303 determines whether, for detection of the vertical-streak-correction subject data, the "auto" detection mode has been set on the display unit 202 (Step S602). When it is determined that the "auto" detection mode has not been set (No at Step S602), the vertical streak position stored in the storing unit 302 is defined as an edge position (Step S604). When the process pertaining to Step S604 is completed, system control proceeds to Step S613 where the image data is divided into the vertical-streak-correction subject data and the image portion data at the edge position (Step S613).

When it is determined that the "auto" detection mode has been set on the display unit 202 (Yes at Step S602), whether a potentially-vertical-streak portion includes a portion where reflection light intensity is below the vertical-streak threshold value is determined (Step S603).

When the dividing unit 303 has determined that the potentially-vertical-streak portion does not include a portion where reflection light intensity is below the vertical-streak threshold value (No at Step S603), the image data output from the image acquiring unit 301 is subjected to the general image processing such as color adjustment without making correction such as shading correction that is to be made to vertical-streak-correction subject data (Step S615).

When it is determined that the potentially-vertical-streak portion includes a portion where reflection light intensity is below the vertical-streak threshold value (Yes at Step S603), the dividing unit 303 defines the position of the portion where reflection light intensity is below the vertical-streak threshold value as an edge position (Step S605).

When it is determined that there are two or more defined edge positions (Yes at Step S606), an average value of reflection light intensities of the potentially-vertical-streak portion at the edge positions is calculated (Step S607). It is then determined whether the calculated average value is below the average vertical-streak threshold value (Step S608).

When it is determined that there are not two or more defined edge positions (No at Step S606), system control proceeds to Step S613 where the image data is divided into the vertical-streak-correction subject data and the image portion data at the defined edge position (Step S613).

When it is determined that the calculated average value is below the average vertical-streak threshold value (Yes at Step S608), the communication unit 203 determines whether a request to perform this scanning operation has been issued by another information apparatus connected to the communication network and transmitted via the communication network (Step S609).

When it is determined that the calculated average value is not below the average vertical-streak threshold value (No at Step S608), system control proceeds to Step S613 where the image data is divided into the vertical-streak-correction subject data and the image portion data at the defined edge position (Step S613).

When the communication unit 203 has determined that the request for this scanning operation has been issued by the other information apparatus and transmitted via the communication network (Yes at Step S609), the communication unit 203 transmits data pertaining to the alarm screen for notification that this scanning operation itself is anomalous rather than the image data to the other information apparatus (Step S610).

When the communication unit 203 has determined that the request for this scanning operation has not been issued by the other information apparatus and transmitted via the communication network (No at Step S609), the alarm screen is displayed on the display unit 202 (Step S611).

When the dividing unit 303 has displayed the alarm screen on the display unit 202 (Step S610) or transmitted the data pertaining to the alarm screen to the information apparatus (Step S611), the dividing unit 303 determines whether an instruction to continue the scanning operation has been entered by a user (Step S612). When it is determined that the instruction to continue the scanning operation has not been entered by a user (No at Step S612), the dividing unit 303 completes the scanning operation.

When it is determined that the instruction to continue the scanning operation has been entered by a user (Yes at Step S612), the image data is divided into the vertical-streak-correction subject data and the image portion data at the defined edge position (Step S613).

The vertical-streak correcting unit 304 makes correction such as shading correction to the vertical-streak-correction subject data, and outputs the corrected data to the image processing unit 305 (Step S614).

The image processing unit 305 merges the corrected vertical-streak-correction subject data with the image portion data having been divided by the dividing unit 303, and performs general image processing such as color adjustment on the merged image data (Step S615). The engine unit 400 outputs the image data having been subjected to the image processing to complete the scanning operation according to the first embodiment.

In the first embodiment, in this manner, the image acquiring unit 301 reads an original positioned on the sheet-fed-mode exposure glass 119, and outputs image data acquired by reading the original that includes the potentially-vertical-streak portion that corresponds to a portion where a foreign material sticks to the exposure glass. The storing unit 302 stores therein the output image data. The dividing unit 303 divides the image data stored in the storing unit 302 into the vertical-streak-correction subject data and the image portion data. The vertical-streak correcting unit 304 makes correction such as shading correction to the vertical-streak-correction subject data to compensate degradation in image quality due to the foreign material. Accordingly, even when a foreign material is sticking to the sheet-fed-mode exposure glass 119, image processing can be performed efficiently.

According to one aspect of the present invention, even when a foreign material is sticking to a read surface of a scanner, image processing can be advantageously performed efficiently.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
   an automatic document feeding unit that automatically conveys an original;
   a reading unit that reads the original having a plurality of pixels thereon while the original is being conveyed by the automatic document feeding unit; and
   an image processing unit, wherein
   the reading unit includes
      an image acquiring unit configured to obtain pixel values that are light intensity reflected from the plurality of pixels on the original and output whole image data consisting of whole of the pixel values;
      a storing unit configured to store therein the whole image data output from the image acquiring unit without performing image processing on the whole image data;
      a dividing unit configured to define, when there exists a degradation portion in image quality that has a lower pixel value than a predetermined threshold value in the whole image data stored in the storing unit, image data of the degradation portion in image quality as a first image portion data and divide the whole image data into the first image portion data and a second image portion data that is remainder of the first portion image data;
   a degradation image portion correcting unit configured to receive the first image portion data divided by the dividing unit from the dividing unit, and perform a correction process on the first image portion data to compensate a degradation in image quality; and
   the image processing unit is configured to receive the second image portion data having been divided by the dividing unit from the dividing unit and the first image portion data corrected by the degradation image portion correcting unit from the degradation image portion correcting unit, and merge the second image portion data with, the first image portion data corrected by the degradation image portion correcting unit to obtain the merged whole image data and perform image processing on the merged whole image data.

2. The image reading apparatus according to claim 1, wherein
the storing unit stores therein a plurality of threshold values as the predetermined threshold value.

3. The image reading apparatus according to claim 1, further comprising an operation receiving unit that receives a designation of the predetermined threshold value, wherein
the dividing unit defines a portion at which the pixel value of image data in the whole pixel value on the whole image data is below the predetermined threshold value designated through the operation receiving unit as the first image portion.

4. The image reading apparatus according to claim 3, further comprising a communication unit that receives the predetermined threshold value from an information apparatus connected to a communication network, wherein
the dividing unit defines a portion at which the pixel value of image data in the whole pixel value on the whole image data is below the predetermined threshold value received by the communication unit as the first image portion.

5. The image reading apparatus according to claim 4, wherein
the storage unit further stores therein a range that indicates a range of the degradation image portion specified in advance, and
the dividing unit defines a portion corresponding to the range of the degradation image portion as the first image portion.

6. The image reading apparatus according to claim 5, wherein
the communication unit further receives the range of the degradation image portion from the information apparatus, and
the dividing unit defines a portion corresponding to the range of the degradation image portion received by the communication unit as the first image portion.

7. The image reading apparatus according to claim 6, wherein
the operation receiving unit further receives a designation of the range of the degradation image portion, and
the storage unit further stores therein the range of the degradation image portion received through the operation receiving unit.

8. The image reading apparatus according to claim 2, wherein
the storage unit further stores in advance therein one of the plurality of threshold values as a threshold value for determining whether the original is processed anomalously, and
upon defining a plurality of degradation image portions, the dividing unit calculates an average value of pixel values of image data at the degradation image portions and determines whether the calculated average value is equal to or smaller than the threshold value for whether the original is processed anomalously.

9. The image reading apparatus according to claim 8, further comprising a display unit that displays, when it is determined that the calculated average value is equal to or smaller than the threshold value for whether the original is processed anomalously, an alarm screen that notifies that the original is processed anomalously.

10. The image reading apparatus according to claim 4, wherein
the communication unit further receives a predetermined reference pixel value from the information apparatus, the predetermined reference pixel value being a base line value in which an average value of pixel values of image data of the original read by the reading unit is equal to or smaller than the base line value, it is determined the original is processed anomalously from the information apparatus, and
upon defining a plurality of first image portions, the dividing unit calculates an average value of pixel values of image data at the first image portions and determines whether the calculated average value is equal to or smaller than the threshold value for whether the original is processed anomalously.

11. The image reading apparatus according to claim 4, wherein
the storage unit further stores in advance therein a threshold value for determining whether the original is processed anomalously,
upon defining a plurality of first image portions, the dividing unit calculates an average value of pixel values of image data at the first image portions and determines whether the calculated average value is equal to or smaller than the threshold value for whether the original is processed anomalously,
the image reading apparatus further comprises a display unit that displays, when it is determined that the calculated average value is equal to or smaller than the threshold value for whether the original is processed anomalously, an alarm screen that notifies that the original is processed anomalously,
when the average value is equal to or smaller than the calculated threshold value for whether the original is processed anomalously, the communication unit transmits data pertaining to the alarm screen to the information apparatus.

12. The image reading apparatus according to claim 9, wherein the alarm screen prompts a user to enter data as to whether to continue a processing for the original.

13. The image reading apparatus according to claim 11, wherein the alarm screen prompts a user to enter data as to whether to continue a processing for the original.

14. The image reading apparatus according to claim 8, wherein when it is determined that the calculated average value is equal to or smaller than the threshold value for whether the original is processed anomalously, the dividing unit deletes the image data stored in the storing unit.

15. A method of reading an image in an image reading apparatus that includes an automatic document feeding unit that automatically conveys an original, a reading unit that reads the original having a plurality of pixels thereon while the original is being conveyed by the automatic document feeding unit, and a storing unit that stores therein whole image data of the original, the method comprising:
image acquiring including the reading unit obtaining pixel values that are light intensity reflected from the plurality of pixels on the original and outputting whole image data of whole of the pixel values;
defining, when there exists a degradation portion in image quality that has a lower pixel value than a predetermined threshold value in the whole image data stored in the storing unit, image data of the degradation portion in image quality as a first image portion data and dividing the whole image data into the first image portion data and a second image portion data that is remainder of the first portion image data;

receiving, in a degradation image portion correcting unit, the first image portion data divided;

performing a correction process on the first image portion data to compensate a degradation in image quality;

receiving the second image portion data having been divided and the first image portion data corrected by the degradation image portion correcting unit;

merging the second image portion data with the first image portion data corrected by the degradation image portion correcting unit to obtain the merged whole image data; and performing image processing on the whole merged image data.

16. A non-transitory computer-readable storage medium having computer-readable program codes embodied in the medium for reading an image in an image reading apparatus that includes an automatic document feeding unit that automatically conveys an original, a reading unit that reads the original having a plurality of pixels thereon while the original is being conveyed by the automatic document feeding unit, and a storing unit that stores therein whole image data of the original, the program codes when executed causing a computer to execute:

image acquiring including the reading unit obtaining pixel values that are light intensity reflected from the plurality of pixels on the original and outputting whole image data of whole of the pixel values;

defining, when there exists a degradation portion in image quality that has a lower pixel value than a predetermined threshold value in the whole image data stored in the storing unit, image data of the degradation portion in image quality as a first image portion data and dividing the whole image data into the first image portion data and a second image portion data that is remainder of the first portion image data;

receiving, in a degradation image portion correcting unit, the first image portion data divided;

performing a correction process on the first image portion data to compensate a degradation in image quality;

receiving the second image portion data having been divided and the first image portion data corrected by the degradation image portion correcting unit;

merging the second image portion data with the first image portion data corrected by the degradation image portion correcting unit to obtain the merged whole image data; and performing image processing on the whole merged image data.

\* \* \* \* \*